United States Patent
Anders et al.

(10) Patent No.: US 11,660,695 B2
(45) Date of Patent: May 30, 2023

(54) WELDING POWER SUPPLIES, WIRE FEEDERS, AND SYSTEMS TO MEASURE A WELD CABLE VOLTAGE DROP

(71) Applicant: Illinois Tool Works Inc., Glenview, IL (US)

(72) Inventors: Adam E. Anders, Oshkosh, WI (US); Brian Schwartz, Appleton, WI (US); Andrew D. Nelson, Appleton, WI (US); Mark Richard Christopher, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 522 days.

(21) Appl. No.: 15/454,293

(22) Filed: Mar. 9, 2017

(65) Prior Publication Data
US 2018/0257161 A1    Sep. 13, 2018

(51) Int. Cl.
*B23K 9/10*   (2006.01)
*B23K 9/235*  (2006.01)

(52) U.S. Cl.
CPC .......... *B23K 9/1006* (2013.01); *B23K 9/1056* (2013.01); *B23K 9/1062* (2013.01); *B23K 9/235* (2013.01)

(58) Field of Classification Search
CPC ...... B23K 9/10; B23K 9/1006; B23K 9/1056; B23K 9/1062
USPC ...... 219/130.1, 130.21, 130.33, 137.7, 130.5
See application file for complete search history.

(56) References Cited

U.S. PATENT DOCUMENTS

| | | | | |
|---|---|---|---|---|
| 5,043,557 A | * | 8/1991 | Tabata | B23K 9/1056 219/130.51 |
| 5,637,241 A | * | 6/1997 | Moates | B23K 11/256 219/109 |
| 6,066,832 A | * | 5/2000 | Uecker | B23K 9/095 219/130.31 |

(Continued)

FOREIGN PATENT DOCUMENTS

| | | |
|---|---|---|
| CN | 1042856 A | 6/1990 |
| CN | 201320650 Y | 10/2009 |

(Continued)

OTHER PUBLICATIONS

Int'l Search Report and Written Opinion PCT/US2018/019678 dated Jun. 26, 2018 (14 pages).

(Continued)

*Primary Examiner* — Dana Ross
*Assistant Examiner* — Ayub A Maye
(74) *Attorney, Agent, or Firm* — McAndrews, Held & Malloy, Ltd.

(57) ABSTRACT

Welding power supplies, wire feeders, and systems to measure a weld cable voltage drop are disclosed. Example welding-type power supplies include a power converter configured to convert input power to output welding-type power to a remote device via a weld cable; a reference conductor connected between the power supply and the remote device; a voltage monitor configured to determine a first voltage between the weld cable and the reference conductor while substantially zero current is being conducted through the reference conductor; and a receiver circuit configured to receive a second voltage between the weld cable and the reference conductor from the remote device.

23 Claims, 3 Drawing Sheets

(56) References Cited

U.S. PATENT DOCUMENTS

| | | | |
|---|---|---|---|
| 6,248,976 B1 | 6/2001 | Blankenship | |
| 6,570,130 B1 * | 5/2003 | Kooken | B23K 9/0953 219/130.01 |
| 6,624,388 B1 | 9/2003 | Blankenship et al. | |
| 6,906,285 B2 | 6/2005 | Zucker | |
| 7,180,029 B2 | 2/2007 | Ott | |
| 8,330,077 B2 | 12/2012 | Rappl | |
| 8,592,724 B2 | 11/2013 | Ott | |
| 8,779,329 B2 | 7/2014 | Rappl | |
| 8,957,344 B2 * | 2/2015 | Rappl | B23K 9/1087 219/73.2 |
| 9,012,807 B2 | 4/2015 | Ott | |
| 9,162,311 B2 | 10/2015 | Ott | |
| 9,511,444 B2 | 12/2016 | Marschke | |
| 9,662,735 B2 | 5/2017 | Salsich | |
| 9,808,882 B2 | 11/2017 | Hutchison | |
| 2002/0113045 A1 | 8/2002 | Blankenship | |
| 2004/0079740 A1 | 4/2004 | Myers | |
| 2006/0102698 A1 | 5/2006 | Ihde | |
| 2007/0221642 A1 | 9/2007 | Era | |
| 2008/0296276 A1 | 12/2008 | Schartner | |
| 2010/0133250 A1 | 6/2010 | Sardy | |
| 2010/0301029 A1 * | 12/2010 | Meckler | B23K 9/095 219/130.1 |
| 2010/0308026 A1 | 12/2010 | Vogel | |
| 2010/0314371 A1 * | 12/2010 | Davidson | B23K 9/10 219/130.1 |
| 2011/0284500 A1 * | 11/2011 | Rappl | F17D 5/06 219/74 |
| 2011/0309054 A1 | 12/2011 | Salsich | |
| 2012/0097644 A1 | 4/2012 | Ott | |
| 2013/0264319 A1 | 10/2013 | Temby | |
| 2013/0327747 A1 | 12/2013 | Dantinne | |
| 2013/0327754 A1 | 12/2013 | Salsich | |
| 2014/0001169 A1 | 1/2014 | Enyedy | |
| 2014/0076872 A1 | 3/2014 | Ott | |
| 2014/0131320 A1 | 5/2014 | Hearn et al. | |
| 2014/0217077 A1 | 8/2014 | Davidson | |
| 2014/0263256 A1 | 9/2014 | Rappl | |
| 2014/0312011 A1 | 10/2014 | Hosoya | |
| 2015/0083702 A1 * | 3/2015 | Scott | B23K 28/00 219/148 |
| 2015/0136746 A1 | 5/2015 | Rappl | |
| 2015/0158104 A1 | 6/2015 | Rappl | |
| 2015/0196970 A1 | 7/2015 | Denis | |
| 2015/0224591 A1 | 8/2015 | Ott | |
| 2015/0273611 A1 | 10/2015 | Denis | |
| 2016/0158868 A1 * | 6/2016 | Trinnes | B23K 9/1087 219/137 PS |
| 2017/0021442 A1 | 1/2017 | Denis | |
| 2017/0120364 A1 | 5/2017 | Zucker | |

FOREIGN PATENT DOCUMENTS

| | | |
|---|---|---|
| CN | 101856764 A | 10/2010 |
| CN | 106461738 A | 2/2017 |
| CN | 108390423 A | 8/2018 |
| EP | 0575082 | 12/1993 |
| EP | 2444191 A2 | 4/2012 |
| EP | 2444191 A3 | 4/2012 |
| EP | 2960001 | 12/2015 |
| KR | 20120048876 | 5/2012 |
| WO | 2016099642 | 6/2016 |

OTHER PUBLICATIONS

Database WPI Jan. 2021 Week 201237 Thomson Sci ent ifi c, London, GB; AN 2012-G07705 XP002781589 (3 pgs.).

Canadian Patent Office, Requisition by Examiner in Application No. 3,053,586 dated Oct. 19, 2020 (4 pages).

European Office Communication Appln No. 18710251.2 dated Jan. 31, 2023.

* cited by examiner

WELDING POWER SUPPLIES, WIRE FEEDERS, AND SYSTEMS TO MEASURE A WELD CABLE VOLTAGE DROP

BACKGROUND

The invention relates generally to welding systems and, more particularly, to welding power supplies, wire feeders, and systems to measure a weld cable voltage drop.

Some welding applications, such as coal-fired boiler repair, shipyard work, and so forth, may position a welding location or workpiece large distances from a multi-process welding power source. The power source provides conditioned power for the welding application, and the welder must pull and monitor a long welding power cable extending from the power source to the welding location. Accordingly, the location of power terminals (e.g., plugs) and controls on or proximate to the welding power source may require the user to stop welding and return to the power source to plug in auxiliary devices, make changes to the welding process, and so forth. In many applications, this may entail walking back considerable distances, through sometimes complex and intricate work environments. Additionally, weld cables (and, particularly, long weld cables) introduce a non-negligible voltage drop between the power source and the site of the work (e.g., the wire feeder, the torch).

Accordingly, there exists a need for systems and methods for providing accurate weld voltages that correspond to the weld voltages set on the weld equipment.

SUMMARY

Welding power supplies, wire feeders, and systems to measure a weld cable voltage drop are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed examples provide a partial or complete compensation of voltage drops occurring between a welding power supply and a remote wire feeder connected via a weld cable and a reference conductor by measuring the voltage drop and/or weld cable impedance. A voltage drop can be used to compensate for an instantaneous voltage that would be subtracted from the voltage feedback in the power source and/or to estimate an effective resistance of the cable. The resistance of the cable may then be used to compensate for voltage drops during welding operations.

To measure the voltage drop in weld cable segment of the weld circuit, disclosed examples share a reference voltage between the power source and the wire feeder. The shared voltage is present on a reference conductor, such as a wire in a control cable connected between the power source and the wire feeder. In disclosed examples, the reference conductor carries substantially zero current (other than the minimal amount used to feed the differential amplifier) so as not to induce a voltage drop on the reference conductor that would reduce the accuracy of the measurement. Voltages between the weld cable and the reference conductor are captured at both the power supply and the wire feeder. The difference between these two voltages is the drop in the weld cable between the power source and the feeder.

As used herein, the term "port" refers to one or more terminals(s), connector(s), plug(s), and/or any other physical interface(s) for traversal of one or more inputs and/or outputs. Example ports include weld cable connections at which a weld cable is physically attached to a device, a gas hose connector that may make physical and/or electrical connections for input and/or output of electrical signals and/or power, physical force and/or work, fluid, and/or gas.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "weld voltage setpoint" refers to a voltage input to the power converter via a user interface, network communication, weld procedure specification, or other selection method.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the term "weld circuit" includes any and all components in an electrical path of a welding operation, regardless whether the welding operation is underway. For example, the weld circuit is considered to include any or all of: power conversion and/or conditioning component(s), weld cable conductor(s), weld torch(es), consumable or non-consumable welding electrode(s), workpiece(s), work clamp(s), ground cable(s) (return cables), weld cable connections (e.g., weld studs that connect a welding power supply to a weld cable). As used herein, the "weld circuit" does not include components or conductors that do not conduct weld current at any time (i.e., that are not in the electrical path of the weld current). For example, the weld circuit does not include separate control cables that transmit data but do not transmit weld current.

As used herein, the term "filtering," as it applies to voltage and/or current values, refers to generating one or more representative values from a larger set of values. For example, a set of voltage values or measurements may be filtered to obtain an average voltage, a root-mean-square value of the voltage values, or any other representative or derivative value(s).

Disclosed example welding-type power supplies include a power converter, a reference conductor, a voltage monitor, and a receiver circuit. The power converter converts input power to output welding-type power to a remote device via a weld cable. The reference conductor is connected between the power supply and the remote device. The voltage monitor configured determines a first voltage between the weld cable and the reference conductor while substantially zero current is being conducted through the reference conductor. The receiver circuit receives a second voltage between the weld cable and the reference conductor from the remote device.

Some example welding-type power supplies further include a current limiting circuit that limits current conducted by the reference conductor while the voltage monitor determines the first voltage. In some examples, the substantially zero current is less than 10 milliamperes.

Some examples further include a controller to determine an offset to a weld voltage setpoint based on the first voltage and the second voltage and control the power converter to convert the input power to output the welding-type power based on the weld voltage setpoint and the offset. Some such examples further include a current monitor to monitor current through the weld cable. The voltage monitor measures the first voltage while the current through the weld cable is more than zero, and the controller determines the offset by determining an impedance of the weld cable. In some examples, the controller determines the offset by calculating a voltage offset based on a measured weld current, and controls the power converter by providing an output voltage to the weld cable that is a sum of the voltage offset and the weld voltage setpoint. Some examples further include a filter to filter voltage measurements made by the voltage monitor, in which the controller determines the offset using the filtered voltage measurements.

Some example welding-type power supplies further include a controller to identify a fault when a difference between the first voltage and the second voltage exceeds a range. In some such examples, the controller is configured to determine the range based on receiving a parameter of the weld cable. In some examples, the reference conductor transmits data to the remote device or receives data from the remote device.

Some examples further include a controller to determine a weld cable impedance based on the first voltage, the second voltage, and a weld circuit current measurement, and control the power converter to convert the input power to output the welding-type power based on a weld voltage setpoint and the weld cable impedance. In some examples, the reference conductor is in a control cable separate from the weld cable, and the receiver circuit is configured to receive the second voltage via the control cable.

Disclosed example welding-type devices include a reference conductor connected between a welding-type power supply and the welding-type device, a voltage monitor to determine a voltage between a weld cable and the reference conductor while substantially zero current is being conducted through the reference conductor, and a transmitter circuit to communicate the voltage to the welding-type power supply.

In some examples, the voltage monitor determines the voltage while current is being conducted through the weld cable. Some such examples further include a current monitor to measure the current through the weld cable, in which the transmitter circuit communicates the current and the voltage monitor determines the voltage while the current is greater than zero.

In some examples, the substantially zero current is less than 10 milliamperes. In some examples, the welding-type device does not include a voltage sense lead. In some examples, the welding-type device is a wire feeder, and includes a wire drive to feed electrode wire to a weld torch. In some examples, the voltage monitor determines the voltage by measuring the voltage between a wire feeder voltage pickup point and the reference conductor.

In some examples the reference conductor is connected directly between the welding-type power supply and the welding-type device. Some examples further include a filter to filter a voltage measurements made by the voltage monitor, in which the transmitter circuit transmits a filtered voltage value.

Figure 1:
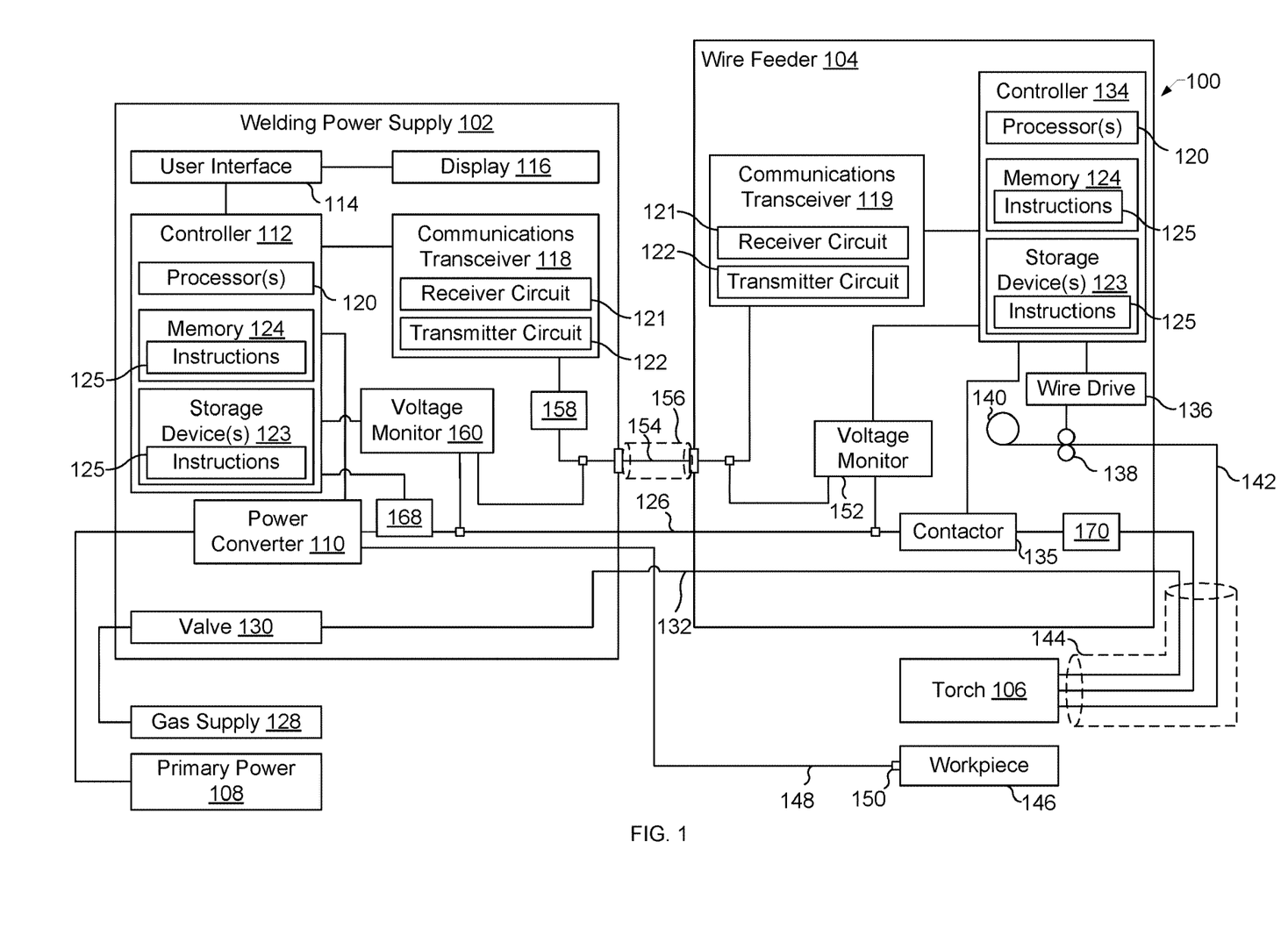
FIG. 1 shows an example welding-type system in accordance with aspects of this disclosure.

Turning now to the drawings, FIG. 1 is a block diagram of an example welding system 100 having a welding-type power supply 102, a wire feeder 104, and a welding torch 106. The welding system 100 powers, controls, and supplies consumables to a welding application. In some examples, the power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1 includes a wire feeder 104 (e.g., for GMAW or FCAW welding), the wire feeder 104 may be replaced by any other type of remote accessory device, such as a stick welding and/or TIG welding remote control interface that provides stick and/or TIG welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes a power converter 110, which may include transformers, rectifiers, switches, and so forth, capable of converting the AC input power to AC and/or DC output power as dictated by the demands of the system 100 (e.g., particular welding processes and regimes). The power converter 110 converts input power (e.g., the primary power 108) to welding-type power based on a weld voltage setpoint and outputs the welding-type power via a weld circuit.

In some examples, the power converter 110 is configured to convert the primary power 108 to both welding-type power and auxiliary power outputs. However, in other examples, the power converter 110 is adapted to convert primary power only to a weld power output, and a separate auxiliary converter is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a controller 112 to control the operation of the power supply 102. The power supply 102 also includes a user interface 114. The controller 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other current operating parameters. Specifically, the user interface 114 may include a display 116 for presenting, showing, or indicating, information to an operator. The controller 112 may also include interface circuitry for communicating data to other devices in the system 100, such as the wire feeder 104. For example, in some situations, the power supply 102 wirelessly communicates with the wire feeder 104 and/or other welding devices within the welding system 100. Further, in some situations, the power supply 102 communicates with the wire feeder 104 and/or other welding devices using a wired connection, such as by using a network interface controller (NIC) to communicate data via a network (e.g., ETHERNET, 10BASE2, 10BASE-T, 100BASE-TX, etc.). In the example of FIG. 1, the controller 112 communicates with the wire feeder 104 via a communications transceiver 118, as described below.

The controller 112 includes at least one controller or processor 120 that controls the operations of the power supply 102. The controller 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power converter 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage).

The example communications transceiver 118 includes a receiver circuit 121 and a transmitter circuit 122. Generally, the receiver circuit 121 receives data transmitted by the wire feeder 104 and the transmitter circuit 122 transmits data to the wire feeder 104. The example wire feeder 104 also includes a communications transceiver 119, which may be similar or identical in construction and/or function as the communications transceiver 118.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the controller 112 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132. In some other examples, the valve 130 is located in the wire feeder 104, and, the gas supply 128 is connected to the wire feeder 104.

In some examples, the wire feeder 104 uses the welding power to power the various components in the wire feeder 104, such as to power a wire feeder controller 134. As noted above, the weld cable 126 may be configured to provide or supply the welding power. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid state device, and/or may be omitted entirely and the weld cable 126 is directly connected to the output to the weld torch 106. The wire feeder 104 includes a wire drive 136 that receives control signals from the wire feeder controller 134 to drive rollers 138 that rotate to pull wire off a spool 140 of wire. The wire drive 136 feeds electrode wire to the weld torch 106. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power converter 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146.

The example wire feeder 104 of FIG. 1 includes a voltage monitor 152 configured to measure a voltage between the weld cable 126 and a reference conductor 154. The example power supply 102 also includes a voltage monitor 160 that measures a voltage between the weld cable 126 and the reference conductor 154. The actual power source output voltage is an approximation that is substantially equal to, but may be slightly different (e.g., a negligible difference) than, the real voltage that is output from the power source to the weld cable 126. The controller 112 may execute a feedback loop using the actual power source output voltage as an input. In some examples, the voltage monitor 160 is included in the power converter 110.

The example wire feeder 104 does not include a voltage sense lead, which is typically used to electrically couple the wire feeder 104 to the workpiece 146 outside of the weld circuit. In other examples, the wire feeder 104 may include a voltage sense lead.

The reference conductor 154 is connected between the power supply 102 and the wire feeder 104, and provides a reference voltage that is used by both voltage monitors 152 and 160 to determine the voltage at multiple points of interest on the weld cable 126. In the example of FIG. 1, the reference conductor is one conductor in a multi-conductor communication cable 156 connected between the power supply 102 and the wire feeder 104, which enables bidirectional communication between the transceivers 118, 119. While the reference conductor 154 may be used to exchange data, the voltage monitors 152, 160 take voltage measurements while the reference conductor 154 is conducting substantially zero current (e.g., less than 10 mA). The example welding power supply 102 may include a current limiting circuit 158 to limit the current conducted by the reference conductor 154 while the voltage monitor 160 and/or the voltage monitor 152 determine the voltage measurements. For example, the current limiting circuit 158 may disconnect and/or reconnect an impedance in series with the reference conductor 154 to reduce current flowing through the reference conductor 154 during voltage measurements by the voltage monitors 152, 160, and/or increase the impedance of the reference conductor 154 to reduce the current flowing through the reference conductor 154 to substantially zero. The voltage monitors 152, 160 take voltage measurements while current is being conducted through the weld cable 126.

The voltage monitor 152 captures one or more measurements (e.g., samples) of the weld cable voltage (e.g., the voltage between the weld cable 126 and the reference conductor 154). In some examples, the voltage monitor 152 assigns time stamps to the measurements for use in performing calculations, compensation, and/or matching of measurements to other measurements.

When the power supply 102 receives the voltage measurements, the power supply 102 may determine a voltage drop across the weld cable 126 between the welding power supply 102 and the wire feeder 104, determine an impedance of the weld cable 126, and/or update a voltage feedback loop for controlling the power converter 110. The voltage feedback loop may be executed by the example controller 112 of FIG. 1. An example voltage feedback loop is a control algorithm that controls an output voltage using an input value and which is responsive to the output voltage and/or an intermediate signal associated with the output voltage. The controller 112 controls the welding-type power output by the power converter 110 according to a voltage feedback loop using the weld voltage feedback information to regulate the voltage at the remote device (e.g., at the wire feeder 104) to the weld voltage setpoint. For example, the controller 112 may use data received from the wire feeder 104 to control the weld voltage at the arc to substantially equal the voltage setpoint (e.g., to compensate for the voltage drop caused by the weld cable 126).

In some examples, the controller 112 receives an average arc voltage of the welding-type power measured at the wire feeder 104, and the voltage monitor 160 determines an average output voltage of the welding-type power measured at an output terminal of the power supply 102. The controller 112 adjusts a weld voltage of the welding-type power based on a difference between the average arc voltage and the average power supply output voltage.

In some examples, the voltage feedback loop is a constant voltage (CV) or voltage-controlled control loop. The example controller 112 calculates a current adjustment using a set of measurable and/or derivable voltage values.

As mentioned above, the weld cable 126 between the power supply 102 and the wire feeder 104 causes a voltage drop. The voltage drop caused by the weld cable 126 ($V_{cabledrop}$) can be expressed as a difference between a voltage measured at the power supply output (e.g., $V_{stud}$, measured across the power supply output stud and the reference conductor 154) and a voltage measured at the wire feeder 104 (e.g., $V_{feeder}$), as expressed in Equation 1 below. The $V_{feeder}$ term is received from the wire feeder 104 based on the measured voltage by the voltage monitor 152.

$$V_{cableDrop} = V_{stud} - V_{feeder} \qquad \text{Equation 1}$$

Adjusting the voltage output by the power converter 110 (e.g., $V_{stud}$) by the voltage drop in the weld cable 126 (e.g., $V_{cableDrop}$) effectively raises the voltage at the wire feeder 104 (e.g., $V_{feeder}$). Thus, the example controller 112 may adjust the power (e.g., voltage and/or current) output by the power converter 110 to cause the voltage at the wire feeder 104 (e.g., effectively the weld voltage or arc voltage) to substantially match a voltage setpoint.

The example controller 112 adjusts the voltage setpoint (e.g., $V_{cmd}$) to determine an adjusted voltage setpoint $V_{adjustedcmd}$ (e.g., an adjusted voltage command) according to Equation 2 below.

$$V_{AdjustedCmd} = V_{cmd} + V_{cableDrop} \qquad \text{Equation 2}$$

When the power supply 102 receives an average voltage measurement from the wire feeder 104 and generates average voltage measurements via the voltage monitor 160, the controller 112 controls the voltage of the welding-type power by determining an adjusted weld voltage setpoint (e.g., $V_{AdjustedCmd}$) based on the weld voltage setpoint (e.g., $V_{cmd}$) and the difference between the average arc voltage and the average power supply output voltage (e.g., an average $V_{cabledrop}$).

An error term $V_{error}$ may be calculated by the relationship shown in Equation 3 below.

$$V_{error} = (V_{AdjustedCmd} - V_{stud}) \qquad \text{Equation 3}$$

By implementing Equation 3, the controller 112 may adjust the welding-type power based on a difference between the adjusted voltage setpoint and the average power supply output voltage. In the example of FIG. 1, $V_{error}$ is used directly in calculating a new current command. If the adjusted voltage error is not used, calculating the output of the power converter 110, that output will not converge to an expected solution.

The example equations may be implemented by the controller 112 to control the voltage of the welding-type power output by the power converter 110 according to the voltage feedback loop by adjusting a voltage compensation value (e.g., $V_{error}$) applied to the welding-type power based on the weld voltage setpoint (e.g., $V_{cmd}$) and a measured voltage included in the weld voltage feedback information (e.g., $V_{feeder}$). In some examples, the controller 112 stores the voltage compensation value for generating the welding-type power for subsequent welding-type operations. The controller 112 may then adjust the voltage of the welding-type power output by the power converter 110 based on the voltage compensation value during welding.

The controller 112 may control the voltage of the welding-type power output by the power converter 110 based on multiple communications received from the wire feeder 104, where the multiple communications correspond to multiple voltage measurements (e.g., $V_{feeder}$ values) by the wire feeder 104. For example, the controller 112 may store multiple power supply voltage measurements (e.g., $V_{stud}$ values) and/or weld current measurements that correspond to the plurality of voltage measurements (e.g., $V_{feeder}$ values), and determine the voltage compensation value based on the weld voltage measurements, the power supply output voltage measurements and/or the weld current measurements. The voltage compensation value may be determined by calculating an impedance of the weld cable 126 and/or by performing a lookup of weld voltage measurements, power supply output voltage measurements and/or weld current measurements in a table stored in the storage device 123 and/or in the memory 124.

In some examples, the controller 112 controls the voltage of the welding-type power output by the power converter 110 according to the voltage feedback loop by adjusting the welding-type power while the weld current is being output through the weld circuit (e.g., instead of making adjustments between welds). Additionally or alternatively, the controller 112 makes the adjustments between welding operations (e.g., adjusts a voltage for a subsequent welding operation to compensate for a voltage error observed during a prior welding operation).

In some examples, the display 116 displays the weld voltage feedback information, such as the measured weld voltage, for real-time viewing of the actual weld voltage by an operator or other viewer of the power supply 102. Additionally, the user interface 114 may permit selection of the weld voltage and/or the power supply output voltage for display on the display device 116. By displaying (or permitting display) of the real-time weld voltage during the weld, the operator, supervisor, and/or any other interested viewer can be assured that the weld voltage specified by the user is the weld voltage at the arc. Such assurance may be useful for verifying compliance with a weld procedure specification.

For example, the power supply 102 may measure the actual current with a current monitor 168 and/or the wire feeder 104 may measure the actual current with a current monitor 170. In some examples, the wire feeder 104 is equipped a current monitor 170 to measure weld cable current in addition to the voltage monitor 152.

The example system 100 of FIG. 1 may determine an initial estimate of the resistance of the weld cable 126, which can then be refined using feedback techniques during welding. The power supply 102 may provide low-voltage power to the wire feeder 104 via the power converter 110 and/or via a secondary, low-power converter to provide sufficient power to operate the controller 134, the communication transceiver 119, and the voltage monitor 152 within the wire feeder 104.

The communications transceivers 118 and 119 may communicate via the reference conductor 154 and/or, more generally, the communication cable 156, via the weld circuit, via wireless communications, and/or any other communication medium. Examples of such communications include weld cable voltage measured at a device that is remote from the power supply 102 (e.g., the wire feeder 104).

The voltage monitor 160 determines a first voltage between the weld cable 126 and the reference conductor 154 while substantially zero current is being conducted through the reference conductor 154. The voltage monitor 152 determines a second voltage between a weld cable 126 and the reference conductor 154 while substantially zero current is being conducted through the reference conductor 154.

The transmitter circuit 122 of the wire feeder 104 transmits a voltage measurement (e.g., by the voltage monitor 152) of a voltage between the weld cable 126 and the reference conductor 154 from the wire feeder 104, and the receiver circuit 121 of the power supply 102 receives the measurement. The example controller 112 may use the voltage drop to control the power supply 102. For example, the controller may determine an offset to a weld voltage setpoint based on the voltage drop, and control the power converter 110 to convert the primary power 108 to output the welding-type power based on the weld voltage setpoint and the offset. Additionally or alternatively, the controller 112 may determine the offset by determining an impedance of the weld cable 126 based on the voltage drop and a current measured by the current monitor 168 and/or the current monitor 170. The controller 112 may determine the offset as a voltage offset based on a measured weld current (e.g., measured by the current monitor 168 and/or the current monitor 170) and a calculated impedance, and controlling the power converter 110 to provide an output voltage to the weld cable 126 that is a sum of the voltage offset and the weld voltage setpoint.

Additionally or alternatively, the controller 112 may identify a fault when the voltage drop exceeds a range. For example, an excessively high voltage drop may indicate a poor physical and/or electrical connection of the weld cable 126 at the power supply 102 and/or the wire feeder 104. The range may be a predetermined voltage drop and/or may be determined based on a parameter of the weld cable 126. For example, the controller 112 may receive one or more parameters of the weld cable 126 via the user interface 114 and calculate an estimated impedance of the weld cable 126 using a lookup table (e.g., stored in the storage device 123 and/or the memory 124) and the received parameter(s). Example parameters include weld cable size (e.g., gauge, diameter, circumference, etc.), cable material, and/or cable length. The controller 112 may look up a resistivity of a specified weld cable size, and multiply the resistivity by the cable length to estimate the weld cable resistivity. The weld cable resistivity may be converted to an estimated voltage drop range using a measured or expected current through the weld cable 126 and an error factor. The controller 112 may place specified limits on a calculated voltage drop range (e.g., the voltage drop range cannot be less than zero, cannot be more than an upper limit, etc.).

In some other examples, the controller 134 in the wire feeder 104 implements portions of a control loop to control a weld voltage at the output of the wire feeder 104 to be substantially equal to a voltage setpoint. For example, the controller 134 may determine a difference between a measured weld voltage (e.g., from the voltage monitor 152) and the voltage setpoint. By determining a difference between the voltage measured at the wire feeder 104 and the voltage setpoint, the wire feeder 104 can feed back a difference or error value for use by the power supply 102. In some examples, the controller 134 implements a filter to filter voltage measurements made by the voltage monitor 152, and the transmitter circuit 122 of the wire feeder 104 transmits a filtered voltage value.

In some examples, the wire feeder 104 executes the control loop to determine a voltage command, and communicates the voltage command to the power supply 102 (e.g., using the communications transceiver 119) to be implemented by the power supply 102 to achieve the setpoint voltage at the weld voltage. The power supply 102 implements the commanded voltage by outputting the commanded voltage to the weld cable 126. In such examples, the wire feeder 104 has knowledge of the current voltage command at the power supply. As such, the example wire feeder 104 may measure a current flowing through the weld cable 126 and use the current, the voltage command, and the voltage measured at the wire feeder 104 to characterize the impedance of the weld cable 126.

Figure 2:
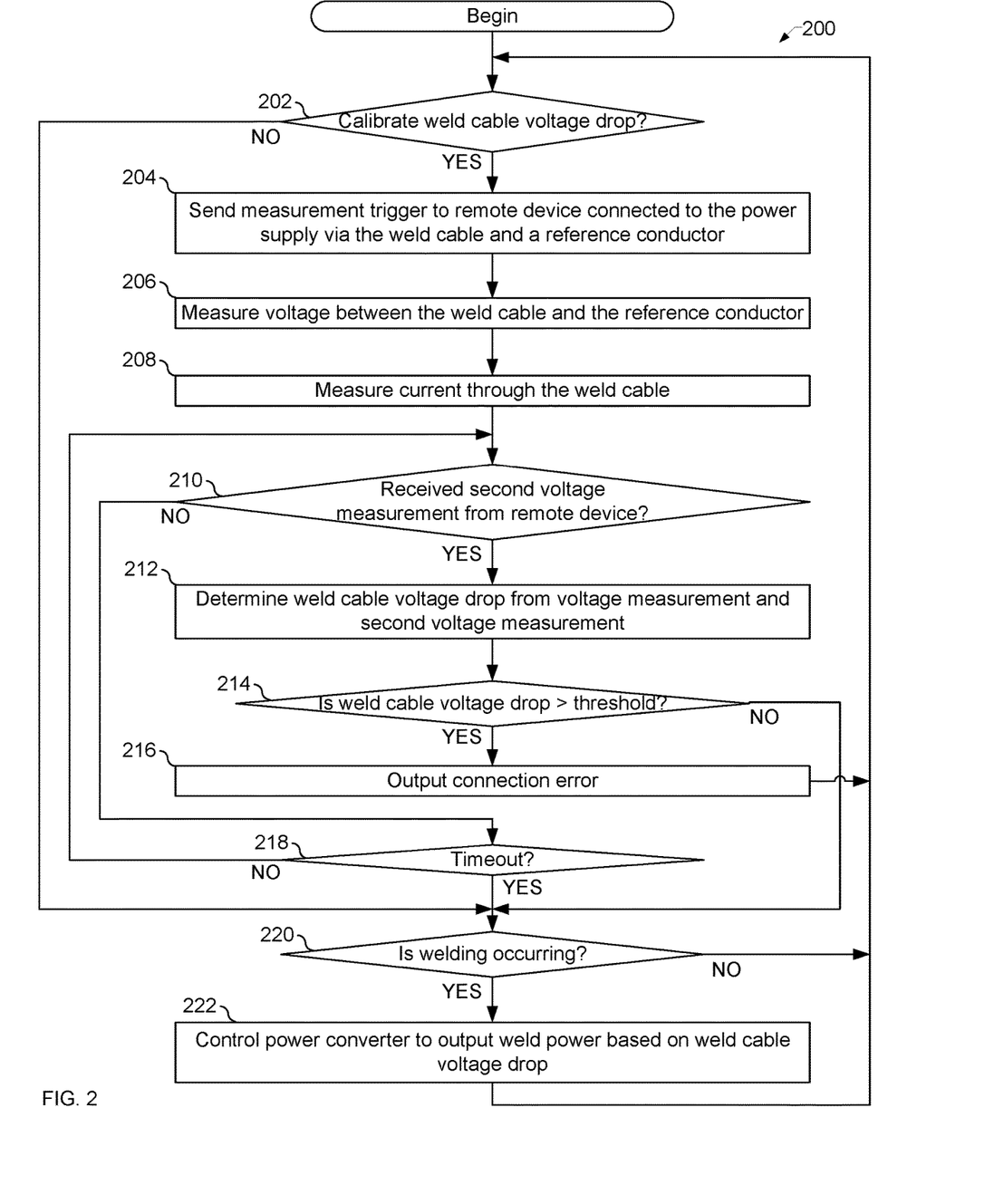
FIG. 2 is a flowchart illustrating example machine readable instructions which may be executed by the example welding-type power supply of FIG. 1 to calculate a weld cable impedance.

FIG. 2 is a flowchart illustrating example machine readable instructions 200 which may be executed by the example welding-type power supply 102 of FIG. 1 to calculate a weld cable impedance. The example instructions 200 of FIG. 2 may be executed by the example controller 112 of FIG. 1.

At block 202, the controller 112 determines whether to calibrate a weld cable voltage drop. For example, the controller 112 may calibrate the weld cable voltage drop upon initialization of the welding power supply 102, periodically during welding and/or while not welding, and/or in response to trigger or event indicating that calibration is appropriate or desired. If the weld cable voltage drop is to be calibrated (block 202), at block 204 the controller 112 sends a measurement trigger to a remote device (e.g., the wire feeder 104). The remote device is connected to the power supply 102 via a weld cable (e.g., the weld cable 126) and a reference conductor (e.g., the reference conductor 154). For example, the reference conductor 154 may be one of a multi-conductor communication cable 156 connected between the power supply 102 and the wire feeder 104 to enable communications and/or control between the power supply 102 and the wire feeder 104. The example communication cable 156 is a cable separate from the weld cable 126, but in some other examples may be integrated within the outer jacket of the weld cable 126.

At block 206, the voltage monitor 160 measures a voltage between the weld cable 126 and the reference conductor 154. The voltage monitor 160 measures the voltage while substantially zero current (e.g., less than 10 milliamperes (mA)) is flowing through the reference conductor 154. In some examples, the controller 112 filters multiple voltage measurements taken by the voltage monitor 160 to determine a filtered voltage. Example filtering includes determining an average voltage, an RMS voltage, and/or a peak voltage from the voltage measurements. At block 208, the current monitor 168 measures a current through the weld cable 126.

At block 210, the controller 112 determines whether a second voltage measurement has been received from the remote device. For example, the receiver circuit 121 may receive a voltage measurement from the wire feeder 104 that represents the voltage measured at the wire feeder 104. The received voltage measurement may include a filtered voltage measurement, such as an average voltage, an RMS voltage, and/or a peak voltage.

If the second voltage measurement has been received from the remote device (block 210), at block 212 the example controller 112 determines a weld cable voltage drop from the voltage measurement (from block 206) and the second voltage measurement (received at block 210). Additionally or alternatively, the controller 112 may determine the impedance of the weld cable 126 using the voltage measurement, the second voltage measurement, and the weld cable current measurement (from block 208).

At block 214, the controller 112 determines whether the weld cable voltage drop is greater than a threshold voltage drop (and/or whether the weld cable impedance is greater than a threshold impedance). The threshold voltage drop may be set to indicate a physical and/or electrical connection error of the weld cable 126 to the power supply 102 and/or the wire feeder 104. If the weld cable voltage drop is greater than a threshold voltage drop (block 214), at block 216 the controller 112 outputs a connection error (e.g., via the user interface 114 and/or the display 116) and returns control to block 202.

If the second voltage measurement has not been received from the remote device (block 210), at block 218 the controller 112 determines whether a timeout (e.g., watchdog timer) has been reached. The timeout may indicate an upper limit on the time between sending the measurement trigger to the remote device and a response being expected from the remote device. If the timeout has not been reached (block 218), control returns to block 210.

If the weld cable voltage drop is not to be calibrated (block 202), if the weld cable voltage drop is not greater than the threshold (block 214), or if the timeout is reached (block 218), at block 220 the controller 112 determines whether welding is occurring. For example, the controller 112 may determine whether the weld cable current is greater than a welding current threshold. If welding is occurring (block 216), at block 218 the controller 112 controls the power converter 110 to output weld power based on the weld cable voltage drop. For example, the controller 112 may cause the power converter 110 to increase an output voltage to compensate for the weld cable voltage drop to achieve an arc voltage substantially equal to the voltage setpoint.

After controlling the power converter to output the weld power (block 222), or if welding is not occurring (block 220), control returns to block 202.

Figure 3:
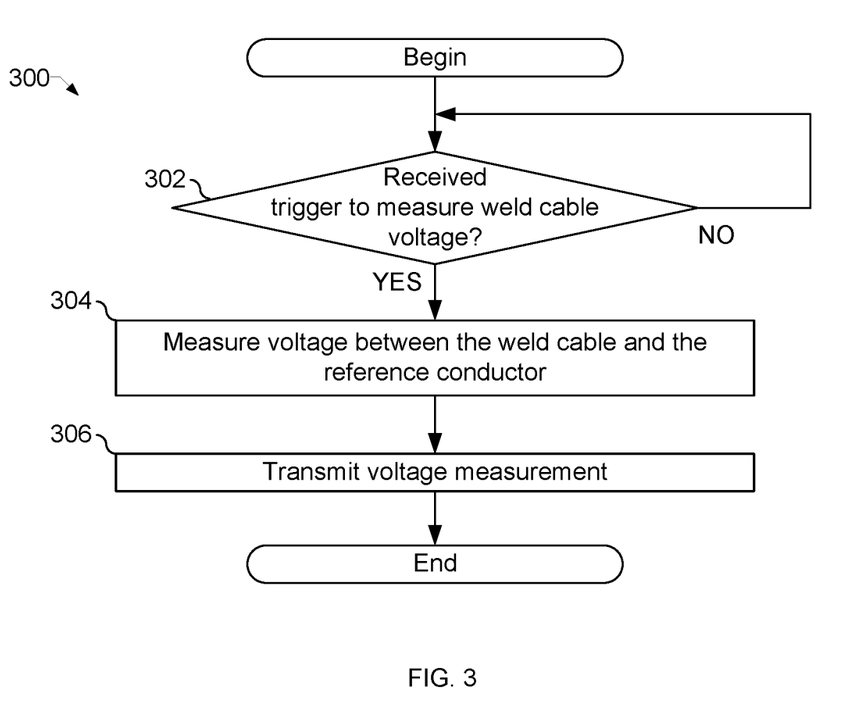
FIG. 3 is a flowchart illustrating example machine readable instructions which may be executed by the example wire feeder of FIG. 1 to perform a weld cable voltage measurement.

FIG. 3 is a flowchart illustrating example machine readable instructions 300 which may be executed by the example wire feeder 104 of FIG. 1 to perform a weld cable voltage measurement. The example instructions 300 may be executed by the controller 134 of the wire feeder 104. The instructions 300 may be performed periodically and/or in parallel with other processes executed by the controller 134.

At block 302, the controller 134 determines whether a trigger to measure the weld cable voltage has been received. For example, the controller 134 may determine whether the receiver circuit 121 of the transceiver 119 has received a trigger via the communication cable 156 and/or via another communication medium. If the trigger to measure the weld cable voltage has not been received (block 302), control returns to block 302 to await the trigger.

When the trigger to measure the weld cable voltage has been received (block 302), at block 304 the voltage monitor 152 measures a voltage between the weld cable 126 and the reference conductor 154. In some examples, the voltage monitor 152 performs multiple measurements of the voltage and the controller 134 filters the voltage measurements. At block 306 the transmitter circuit 122 transmits the voltage measurement(s) and/or a filtered voltage measurement to the power supply 102. The example instructions 300 then end.

While the examples of FIGS. 1-3 disclose measuring the weld cable current at the power supply 102, the weld cable current may additionally or alternatively be measured at the wire feeder 104. The current measurements and/or filtered current measurements may be communicated to the power supply 102.

While the example instructions 200, 300 of FIGS. 2 and 3 describe transmitting a trigger signal prior to measurement by the voltage monitors 152, 160, in some other examples the voltage monitor 152 repeatedly or continuously measures the voltage and the transceiver 119 sends a stream of voltage measurements to the power supply 102.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   power converter configured to convert input power to output welding-type power to a remote device via a weld cable;
   a reference conductor connected between the power supply and the remote device;
   a first voltage monitor configured to determine a first voltage between a first location on the weld cable and a first location on the reference conductor while less than 10 milliamperes of current is being conducted through the reference conductor and a second current is being conducted through the weld cable, and the second current is higher than the current conducted through the reference conductor;
   a receiver circuit configured to receive, from the remote device, a measurement of a second voltage between a second location on the weld cable and a second location on the reference conductor by a second voltage monitor of the remote device while less than 10 milliamperes of current is being conducted through the reference conductor and the second current is being conducted through the weld cable, wherein the second location is different than the first location; and
   a controller configured to determine an offset to a weld voltage setpoint based on the first voltage and the second voltage.

2. The welding-type power supply as defined in claim 1, further comprising a current limiting circuit to limit current conducted by the reference conductor while the first voltage monitor determines the first voltage.

3. The welding-type power supply as defined in claim 1, wherein the first voltage monitor is configured to determine the first voltage between the first location on the weld cable and the reference conductor while the current is zero.

4. The welding-type power supply as defined in claim 1, wherein the controller is configured to:
   control the power converter to convert the input power to output the welding-type power based on the weld voltage setpoint and the offset.

5. The welding-type power supply as defined in claim 4, further comprising a current monitor configured to monitor the second current through the weld cable, wherein the first voltage monitor is configured to measure the first voltage while the current through the weld cable is more than zero, and the controller is configured to determine the offset by determining an impedance of the weld cable.

6. The welding-type power supply as defined in claim 4, wherein the controller is configured to determine the offset by calculating a voltage offset based on a measured weld current, and controlling the power converter comprises providing an output voltage to the weld cable that is a sum of the voltage offset and the weld voltage setpoint.

7. The welding-type power supply as defined in claim 4, further comprising a filter configured to filter a plurality of voltage measurements made by the first voltage monitor, the controller configured to determine the offset using the filtered voltage measurements.

8. The welding-type power supply as defined in claim 1, further comprising a controller configured to identify a fault when a difference between the first voltage and the second voltage exceeds a range.

9. The welding-type power supply as defined in claim 8, wherein the controller is configured to determine the range based on receiving a parameter of the weld cable.

10. The welding-type power supply as defined in claim 1, wherein the reference conductor is configured to transmit data to the remote device or receive data from the remote device.

11. The welding-type power supply as defined in claim 1, further comprising a controller configured to:
determine a weld cable impedance based on the first voltage, the second voltage, and a weld circuit current measurement; and
control the power converter to convert the input power to output the welding-type power based on a weld voltage setpoint and the weld cable impedance.

12. The welding-type power supply as defined in claim 1, wherein the reference conductor is in a multi-conductor control cable separate from the weld cable, and the receiver circuit is configured to receive the second voltage via the control cable.

13. The welding-type power supply as defined in claim 1, further comprising a work cable configured to conduct the welding-type power, the reference conductor being connected between the welding-type power supply and the remote device separately from the weld cable and the work cable.

14. The welding-type power supply as defined in claim 1, wherein the reference conductor is in a separate circuit than with the weld cable.

15. A welding-type device, comprising:
a reference conductor connected between a welding-type power supply and the welding-type device;
a voltage monitor configured to determine a voltage between a weld cable and a first location on the reference conductor, wherein the weld cable conducts welding-type power from the welding-type power supply to the welding-type device;
a controller configured to control the voltage monitor to measure the voltage while less than 10 milliamperes of current is being conducted through the reference conductor and a second current is being conducted through the weld cable, wherein the second current is higher than the current conducted through the reference conductor; and
a transmitter circuit configured to communicate the voltage to the welding-type power supply, the controller configured to control the transmitter circuit to communicate the voltage.

16. The welding-type device as defined in claim 15, further comprising a current monitor configured to measure the second current through the weld cable, wherein the controller is configured to control the transmitter circuit to communicate the current and control the voltage monitor to determine the voltage while the current is greater than zero.

17. The welding-type device as defined in claim 15, wherein the voltage monitor is configured to determine the voltage between the weld cable and the reference conductor while the current is zero.

18. The welding-type device as defined in claim 15, wherein the welding-type device does not include a voltage sense lead.

19. The welding-type device as defined in claim 15, further comprising a wire drive to feed electrode wire to a weld torch.

20. The welding-type device as defined in claim 15, wherein the voltage monitor is configured to determine the voltage by measuring the voltage between a wire feeder voltage pickup point and the reference conductor.

21. The welding-type device as defined in claim 15, wherein the reference conductor is connected directly between the welding-type power supply and the welding-type device.

22. The welding-type device as defined in claim 15, further comprising a filter configured to filter a plurality of voltage measurements made by the voltage monitor, the transmitter circuit configured to transmit a filtered voltage value.

23. The welding-type device as defined in claim 15, wherein the welding-type device is a wire feeder or a remote control interface.

* * * * *